(12) United States Patent
Greco

(10) Patent No.: US 12,234,685 B2
(45) Date of Patent: Feb. 25, 2025

(54) DEVICE FOR DRIVING A CLOSURE OR SHADING MEMBER IN A BUILDING BY MEANS OF A SOLAR ENERGY SOURCE

(71) Applicant: ABC Volet, Sallanches (FR)

(72) Inventor: Xavier Greco, Sallanches (FR)

(73) Assignee: ABC VOLET, Sallanches (FR)

( * ) Notice: Subject to any disclaimer, the term of this patent is extended or adjusted under 35 U.S.C. 154(b) by 274 days.

(21) Appl. No.: 17/914,873

(22) PCT Filed: Apr. 9, 2021

(86) PCT No.: PCT/IB2021/052946
§ 371 (c)(1),
(2) Date: Sep. 27, 2022

(87) PCT Pub. No.: WO2021/209869
PCT Pub. Date: Oct. 21, 2021

(65) Prior Publication Data
US 2023/0148433 A1 May 11, 2023

(30) Foreign Application Priority Data
Apr. 15, 2020 (FR) ..................................... 20 03763

(51) Int. Cl.
*E06B 9/72* (2006.01)
*E06B 9/17* (2006.01)
(Continued)

(52) U.S. Cl.
CPC .................. *E06B 9/17* (2013.01); *E06B 9/72* (2013.01); *H02J 7/35* (2013.01); *H02S 10/20* (2014.12)

(58) Field of Classification Search
CPC ...... E06B 9/72; E06B 9/68; E06B 2009/6809; E06B 9/70; E06B 9/56; E06B 9/40; H02S 10/20; H02S 10/00; H02J 7/35
See application file for complete search history.

(56) References Cited

U.S. PATENT DOCUMENTS 7,663,460 B2 2/2010 Suzuki
2013/0284234 A1* 10/2013 Funayama ............ H01L 31/048
136/251
(Continued)

FOREIGN PATENT DOCUMENTS

CN 107489334 A 12/2017
DE 102009034146 B3 * 2/2011 ................ E06B 9/11
(Continued)

OTHER PUBLICATIONS

Machine translation of FR3138162 (Year: 2024).*
Machine translation FR3123087 (Year: 2022).*
Machine translation DE102009034146 (Year: 2011).*

*Primary Examiner* — Abe Massad
*Assistant Examiner* — Jeremy C Ramsey
(74) *Attorney, Agent, or Firm* — William H. Eilberg

(57) ABSTRACT

A device for driving a closure component (9) in a building from a solar energy source (1), comprising at least one low-voltage alternating current electric motor (3) mechanically coupled to the closure component, a direct current electrical energy accumulator element (2), a solar energy source delivering a direct voltage. The electrical energy accumulator element has a nominal voltage lower than said effective electric voltage and greater than the direct voltage delivered by the solar energy source. A DC-DC charger (4) converts the output electrical energy from the solar energy source into electrical energy with an electric voltage for charging the electrical energy accumulator element. A DC-AC converter (5) converts the electrical energy with a direct output voltage of the electrical energy accumulator element into electrical energy with an alternating voltage that is able to power said electric motor.

11 Claims, 5 Drawing Sheets

(51) Int. Cl.
  *H02J 7/35*   (2006.01)
  *H02S 10/20*   (2014.01)

(56) References Cited

U.S. PATENT DOCUMENTS

| | | | | |
|---|---|---|---|---|
| 2014/0224434 | A1* | 8/2014 | Gross | E06B 9/42 |
| | | | | 160/405 |
| 2016/0376843 | A1* | 12/2016 | Schneider | E06B 9/68 |
| | | | | 318/16 |
| 2018/0082777 | A1 | 3/2018 | Vandeplassche | |
| 2020/0018118 | A1* | 1/2020 | Geiger | A47H 1/13 |
| 2020/0080369 | A1 | 3/2020 | Achiel | |
| 2023/0019165 | A1* | 1/2023 | Baudo | E06B 9/42 |

FOREIGN PATENT DOCUMENTS

| | | | | |
|---|---|---|---|---|
| FR | 3123087 A1 | * | 11/2022 | E06B 9/17 |
| FR | 3138162 A1 | * | 1/2024 | E06B 9/17007 |

* cited by examiner

DEVICE FOR DRIVING A CLOSURE OR SHADING MEMBER IN A BUILDING BY MEANS OF A SOLAR ENERGY SOURCE

TECHNICAL FIELD OF THE INVENTION

The present invention relates to the field of motorized closure or shutter components in a building.

Motorized closure or shutter components in buildings can be a roller shutter for a door or window, a blind, a garage door, for example. The drive torque required to maneuver the closure or shutter component depends on the mass to be moved.

If a small mass needs to be moved, for example, for a window or door roller shutter, or for a small blind, the required drive torque is relatively low, less than 10 Nm. In this case, a solar electrical energy source can be easily used, such as a solar panel delivering a direct voltage, which directly powers a direct voltage electrical energy accumulator element, which electrical energy accumulator element is capable of directly powering a direct current motor with a nominal voltage of the order of 12 V and that is mechanically coupled to the closure or shutter component. The system can then operate completely autonomously, requiring no cables to be installed or removed, and not requiring the provision of a power supply connected to the public power distribution network.

For example, document WO 2018/216023 A1 describes a device for driving a closure component in a building from a solar electrical energy source made up of photovoltaic panels themselves forming the shutter component. The photovoltaic panels deliver a direct voltage to an accumulator. A control circuit controls the operation of a motor that drives the closure component. The document does not describe the use of an alternating current motor. The device further comprises a DC-AC converter that converts the electrical energy with a direct output voltage of the electrical energy accumulator element into electrical energy with an alternating voltage available on an output terminal for powering various conventional alternating devices. The document does not describe powering the motor using the DC-AC converter. The device can be suitable for driving a low mass shutter component.

However, if a larger mass needs to be moved, for example, for a large blind or for a garage door, the necessary drive torque can be much greater, typically greater than 10 Nm. An alternating current electric motor is then used, operating at the standard supply voltage of 230 V, supplied from the public electrical power distribution network. The system then cannot operate completely autonomously, and it requires the installation of power cables.

DISCLOSURE OF THE INVENTION

A problem set forth by the present invention involves designing an improved device for driving a closure or shutter component in a building from a solar electrical energy source that is capable of, on the one hand, mechanically driving all types of shutter or closure components by virtue of a drive torque with sufficient intensity, and that is capable of, on the other hand, operating completely autonomously by virtue of the use of solar energy alone.

To this end, the aim of the invention is to use an alternating current electric motor with a nominal voltage of 230 V as a drive means, in order to benefit from a wider range of control protocols to cover the whole market, to benefit from a lower cost with respect to equal-power direct current motors, and to benefit from better reliability by virtue of the lack of internal friction parts. The problem then involves powering such a 230 V alternating current electric motor from a solar electrical energy source delivering a low voltage direct electric current, with the power supply assembly having to be small enough to be housed in a motor enclosure for a shutter or closure component.

In order to achieve these and other aims, the invention proposes a device for driving a closure or shutter component in a building, comprising:
- at least one motor mechanically coupled to the closure or shutter component;
- a direct current electrical energy accumulator element;
- a solar electrical energy source delivering a direct voltage;
- a DC-AC converter that converts the electrical energy with a direct output voltage of the electrical energy accumulator element into electrical energy with an alternating output voltage;

wherein:
- the motor is a low-voltage alternating current electric motor having an effective electric voltage in the range ranging between 50 to 1.000 V;
- the solar electrical energy source delivers a direct voltage lower than the effective electric voltage of the electric motor;
- the electrical energy accumulator element has a nominal voltage lower than said effective electric voltage and greater than the direct voltage delivered by the solar electrical energy source;
- a DC-DC charger converts the output electrical energy of the solar electrical energy source into electrical energy with the recharging electric voltage of the direct current electrical energy accumulator element;
- the DC-AC converter supplies said alternating current electric motor.

Advantageously, the effective electric voltage of the electric motor is approximately 230 V. In this way, the most common and mass produced electric motors in the field of large shutter or closure components can be used at lower cost.

According to another aspect, the aim of the present invention is to maximize the efficiency of the device, in order to provide, in a volume limited by the permissible space of the device, sufficient energy autonomy for driving the closure component even in the event of low solar radiation and/or small solar panels forming the solar electrical energy source.

In order to achieve these and other aims, provision advantageously can be made for the nominal voltage of the electrical energy accumulator element to be within a range of approximately 24 V to 30 V, providing a good compromise that optimizes the efficiency of the electronic circuits converting, on the one hand, the direct electrical energy of the solar electrical energy source into direct electrical energy delivered into the electrical energy accumulator element, and converting, on the other hand, the direct electrical energy of the electrical energy accumulator element into alternating electrical energy delivered to the alternating current electric motor.

Also, in order to optimize the energy efficiency, provision advantageously can be made for the DC-DC charger to be controlled by a control circuit regulating the electric voltage and the electric current drawn from the solar electrical energy source, so as to remain as close as possible to the maximum power point of the solar electrical energy source.

Also, in order to optimize the energy efficiency, but also in order to reduce the size of the device to allow it to be introduced into the commonly used motor enclosures, provision advantageously can be made for the DC-AC converter to be a converter with two successive stages, comprising a first stage in the form of a step-up DC-DC converter, which converts the direct voltage of the electrical energy accumulator element into a direct output voltage at least equivalent to the peak voltage of the wave of the final voltage contemplated for powering the electric motor, and comprising a second stage that converts the direct output voltage of the first stage into a sinusoidal alternating voltage with an appropriate shape and amplitude for powering the electric motor, so that the second stage powers the electric motor.

The first stage can comprise an H-bridge of electronic switches, the input points of which are at the terminals of the electrical energy accumulator element, and the junction points of which supply the primary of a step-up transformer, the secondary of which supplies a rectifier element providing said direct output voltage. The step-up transformer can be a planar transformer capable of operating at high frequency, so that its volume is reduced and it is highly efficient. Operating at 50 kHz can be advantageous in order to minimize losses in both the transformer and in the electronic switches.

The second stage can comprise an H-bridge of electronic switches, the input points of which are at the terminals of the rectifier element, the junction points of which supply the motor by means of a low-pass filter, the electronic switches being controlled by a microcontroller programmed to carry out a bipolar pulse width modulation producing an output voltage with variable duty cycle slots, which, after filtration by the low-pass filter, powers the motor with a substantially sinusoidal single-phase voltage.

According to another aspect, the invention proposes a closure or shutter component in a building, provided with a drive device as defined above.

BRIEF DESCRIPTION OF THE DRAWINGS

Further aims, features and advantages of the present invention will become apparent from the following description of particular embodiments, which are provided with reference to the accompanying figures, in which.

DESCRIPTION OF THE PREFERRED EMBODIMENTS

Figure 1:
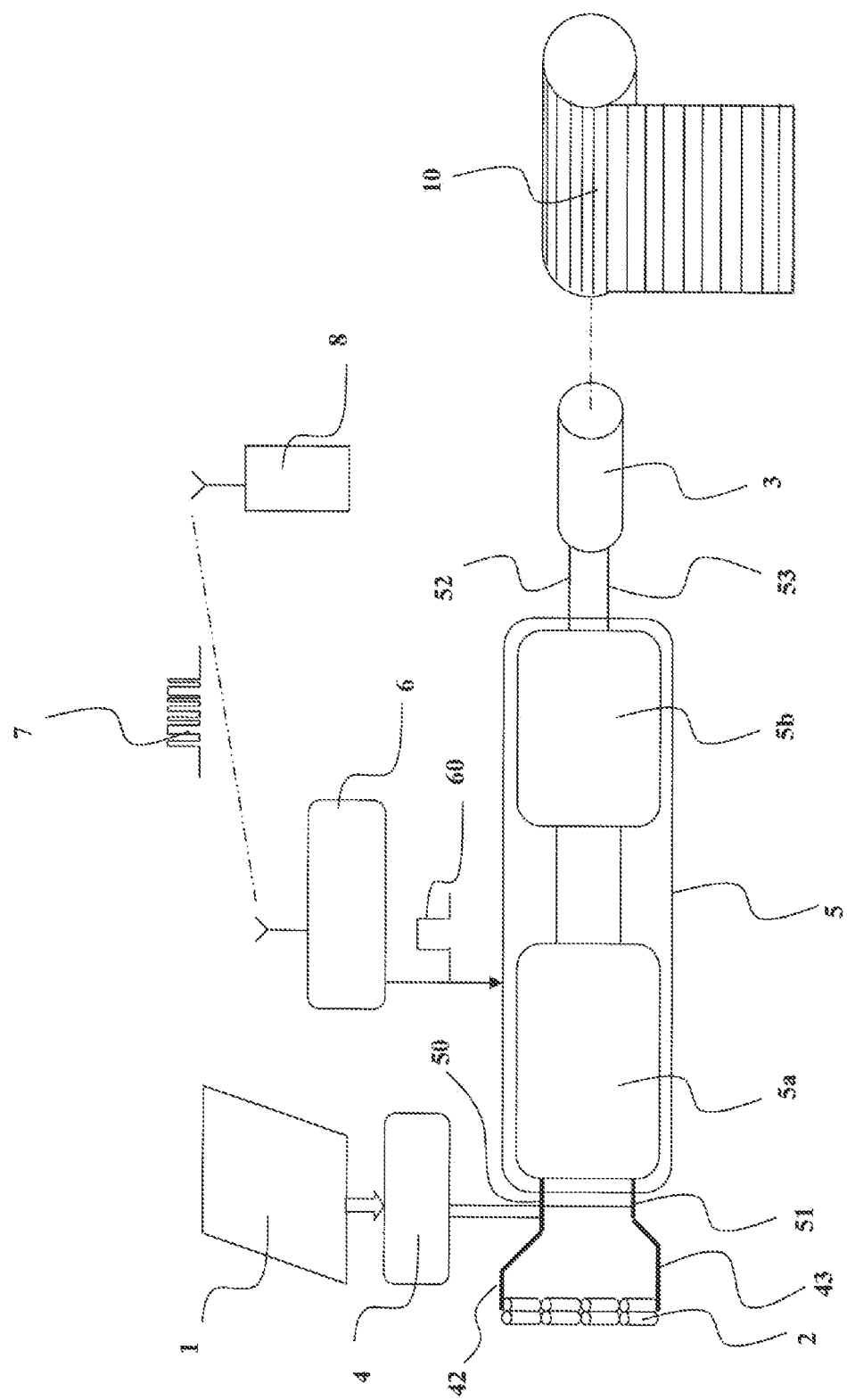
FIG. 1 is a functional block diagram of the device according to one embodiment of the present invention, illustrating the main components of the device.

As illustrated in FIG. 1, the device according to the invention generally comprises a solar electrical energy source 1, an electrical energy accumulator element 2, and an alternating current electric motor 3.

The solar electrical energy source 1 is in the form of a photovoltaic solar panel, directly delivering energy in electrical form. The output voltage of the solar electrical energy source 1 is within a range of approximately 12 to 18 V, namely the usual range of the output voltages of photovoltaic solar panels. The output power of the photovoltaic panel must be as high as possible relative to the low surface area to be allocated thereto. Typical power with a peak of the order of 5 or 6 W can be suitable. The technology used for the photovoltaic panel therefore must be quite efficient, for example, of the monocrystalline or polycrystalline type.

The alternating current electric motor 3 is of a type that is capable of being powered by a single-phase electric voltage that is efficient in the range ranging between 50 and 1,000 volts, advantageously of the order of approximately 230 V, and is able to deliver a nominal torque of 10 Nm to 80 Nm, for example, a nominal torque of approximately 50 Nm.

The nominal voltage of the electrical energy accumulator element 2 is within a range of approximately 24 to 30 V, forming an intermediate electric voltage between the nominal voltage delivered by the solar electrical energy source 1 and the nominal power supply voltage of the electric motor 3, allowing the voltage required to operate the electric motor 3 to be achieved more easily. In practice, this electrical energy accumulator element 2 is a battery pack connected in series. Each accumulator is a Li-ion battery with a nominal voltage of 3.6 V and with a unit capacity of at least 2,600 milliampere hours. Thus, the electrical energy accumulator element 2 can be made, for example, by placing 8×3.6 V batteries in series.

In order to allow the electrical energy accumulator element 2 to be recharged with a nominal voltage ranging between approximately 24 and 30 volts, from a solar electrical energy source 1 with a lower nominal voltage, from approximately 12 to 18 V, a DC-DC charger 4 is inserted between the solar electrical energy source 1 and the electrical energy accumulator element 2, which DC-DC charger converts the low output voltage electrical energy of the solar energy source 1 into electrical energy at the voltage for recharging the electrical energy accumulator element 2.

In order to enable the electric motor 3 to be powered with a single-phase alternating current electric voltage of approximately 230 V from the electrical energy accumulator element 2 with a direct nominal voltage of approximately 24 to 30 V, a DC-AC converter 5 with two-stages, 5 and 5b, is inserted between the electrical energy accumulator element 2 and the electric motor 3, which DC-AC converter converts the direct output voltage electrical energy of the electrical energy accumulator element 2 into electrical energy with an alternating output voltage capable of powering the alternating current electric motor 3.

Input terminals 50 and 51 of the DC-AC converter 5 are connected to the terminals 42 and 43 of the electrical energy accumulator element 2, while output terminals 52 and 53 are connected to the alternating current electric motor 3.

A radio receiver 6 receives a control radio signal 7 transmitted by a remote transmitter 8, in order to control the start-up of the motor 3. The radio control signal 7 is in the form of a frame of a few tens of milliseconds, containing the direction of rotation information. Upon receipt of this radio control signal 7, the radio receiver 6 sends a corresponding command 60 to the DC-AC converter 5 for powering the motor 3 that activates the closure or shutter component 9 in the appropriate direction.

Figure 2:
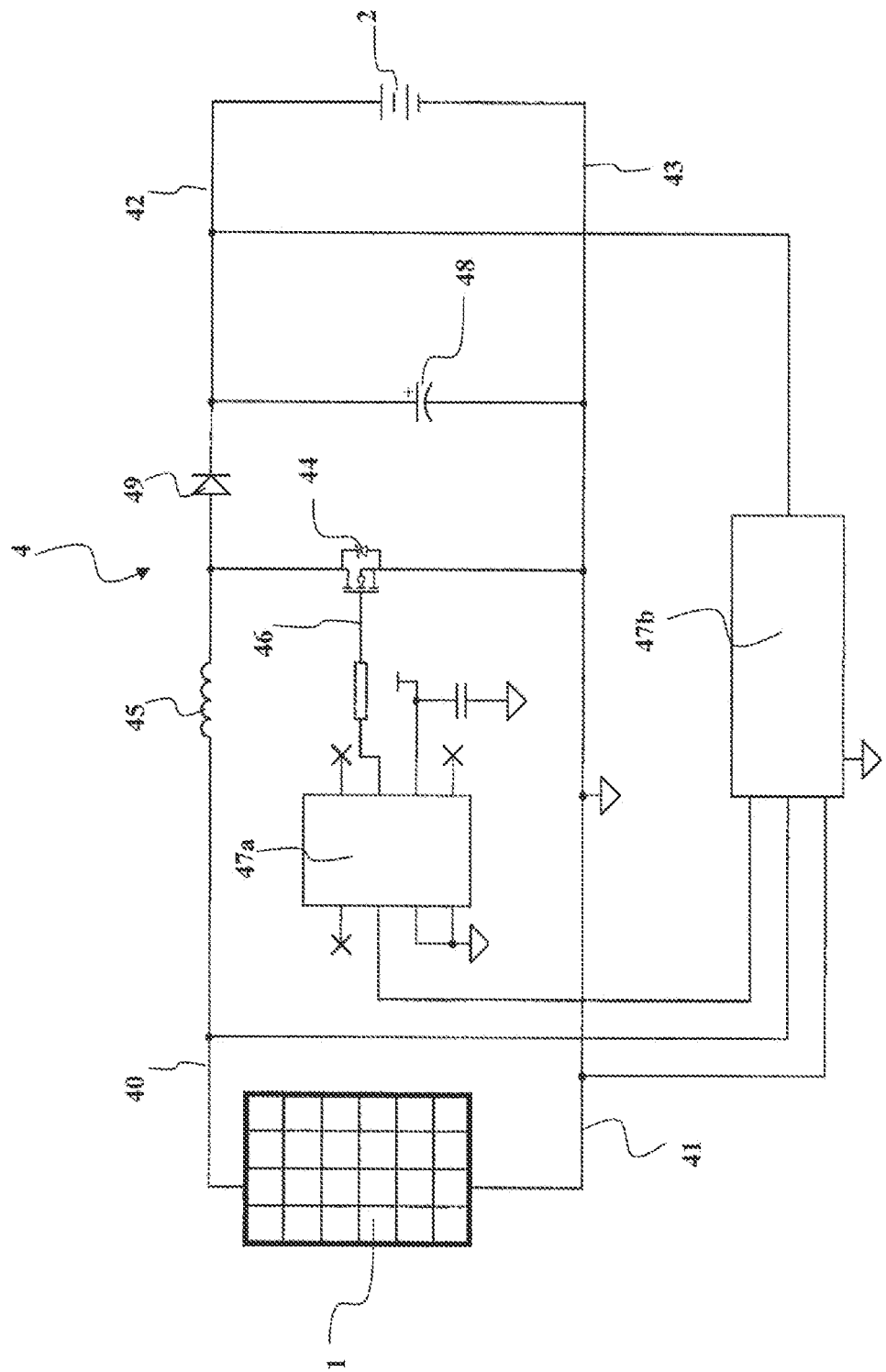
FIG. 2 is an electrical diagram of a DC-DC charger according to one embodiment of the present invention, for supplying the direct electrical energy accumulator element from a solar electrical energy source.

Reference will now be made to FIG. 2, which illustrates one embodiment of the present invention for the DC-DC charger 4 for supplying the direct electrical energy accumulator element 2 from the solar electrical energy source 1.

In this embodiment, the DC-DC charger 4 is a step-up converter, of the parallel chopper type, the input terminals 40 and 41 of which are connected to the solar electrical energy source 1, and the output terminals 42 and 43 of which are connected to the electrical energy accumulator element 2. The DC-DC charger 4 comprises an electronic switch 44 of the MOSFET type (insulated gate field effect transistor), controlled by a control circuit comprising a microcontroller 47b and a shaping circuit 47a. The source-drain circuit of the electronic switch 44 is connected in series with an inductor 45 to the input terminals 40 and 41, and its gate 46 receives, by means of the shaping circuit 47a, a pulse control signal generated by the microcontroller 47b. A capacitor 48 is connected to the output terminals 42 and 43, and a Schottky diode 49 is connected between the electronic switch 44 and the capacitor 48.

The microcontroller 47b comprises a recorded program by which the microcontroller 47b scans the electric voltage information at the input terminals 40 and 41, scans the electric current information delivered by the solar electrical energy source 1, and controls the switching of the electronic switch 44 so as to remain as close as possible to the maximum power point of the solar electrical energy source 1. This maximum power point is close to 80% of the maximum voltage delivered by the solar electrical energy source 1. This program can be of the type generally called MPPT (Maximum Power Point Tracking), well known to a person skilled in the art in the use of solar panels.

The microcontroller 47b is also programmed to maintain the recharging voltage of the batteries at a good level at each instant while limiting the current if necessary, in particular when recharging above 80% of the full charge of the batteries forming the electrical energy accumulator element 2.

The microcontroller 47b also can be programmed to balance the charge of the batteries, which are in series in the electrical energy accumulator element 2, by controlling transistors associated with resistors that discharge surplus energy from the batteries when necessary.

Figure 3:
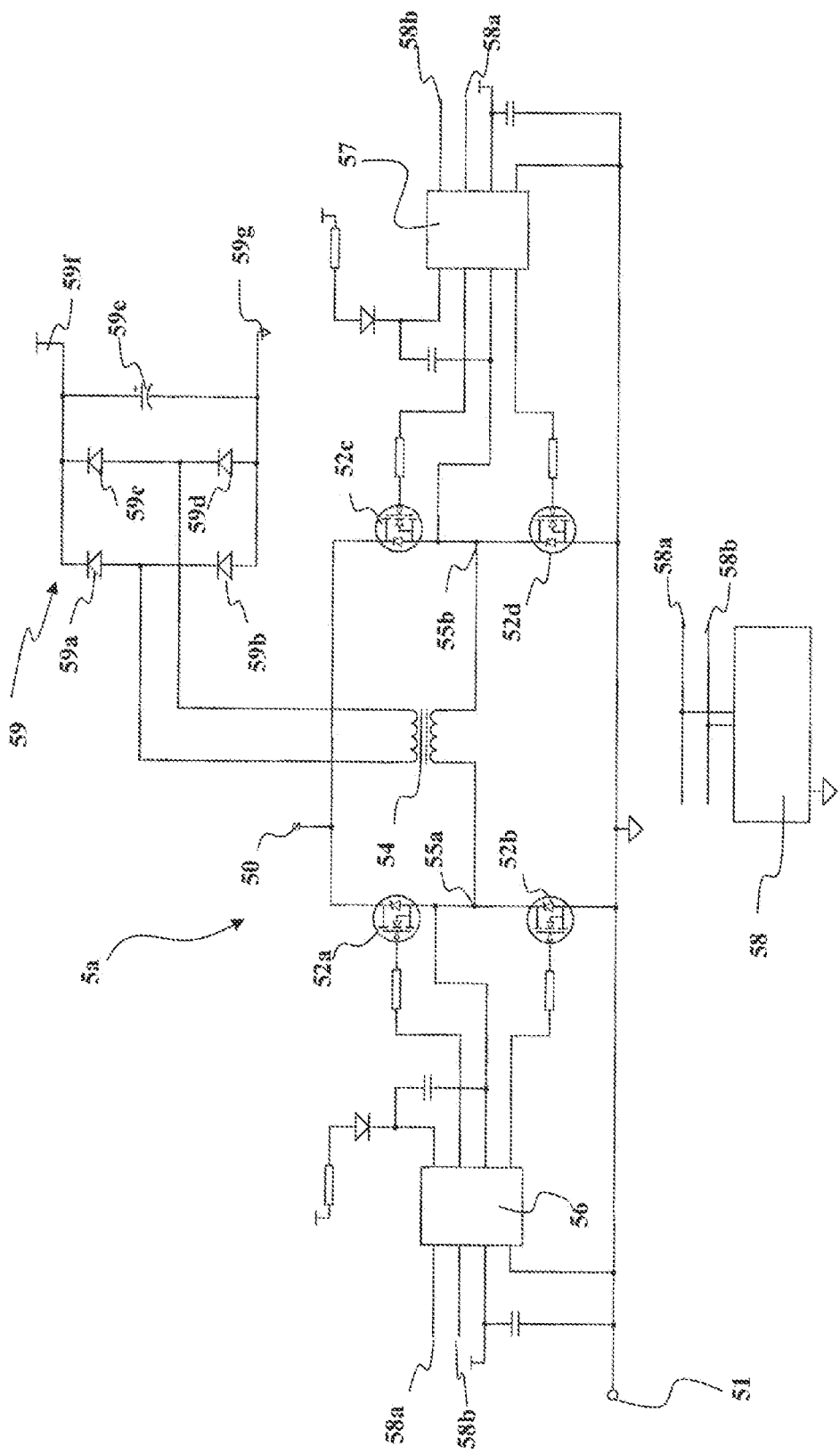
FIG. 3 is an electrical diagram of a step-up DC-DC converter according to one embodiment of the present invention, completing the first stage of the DC-AC converter.
Figure 4:
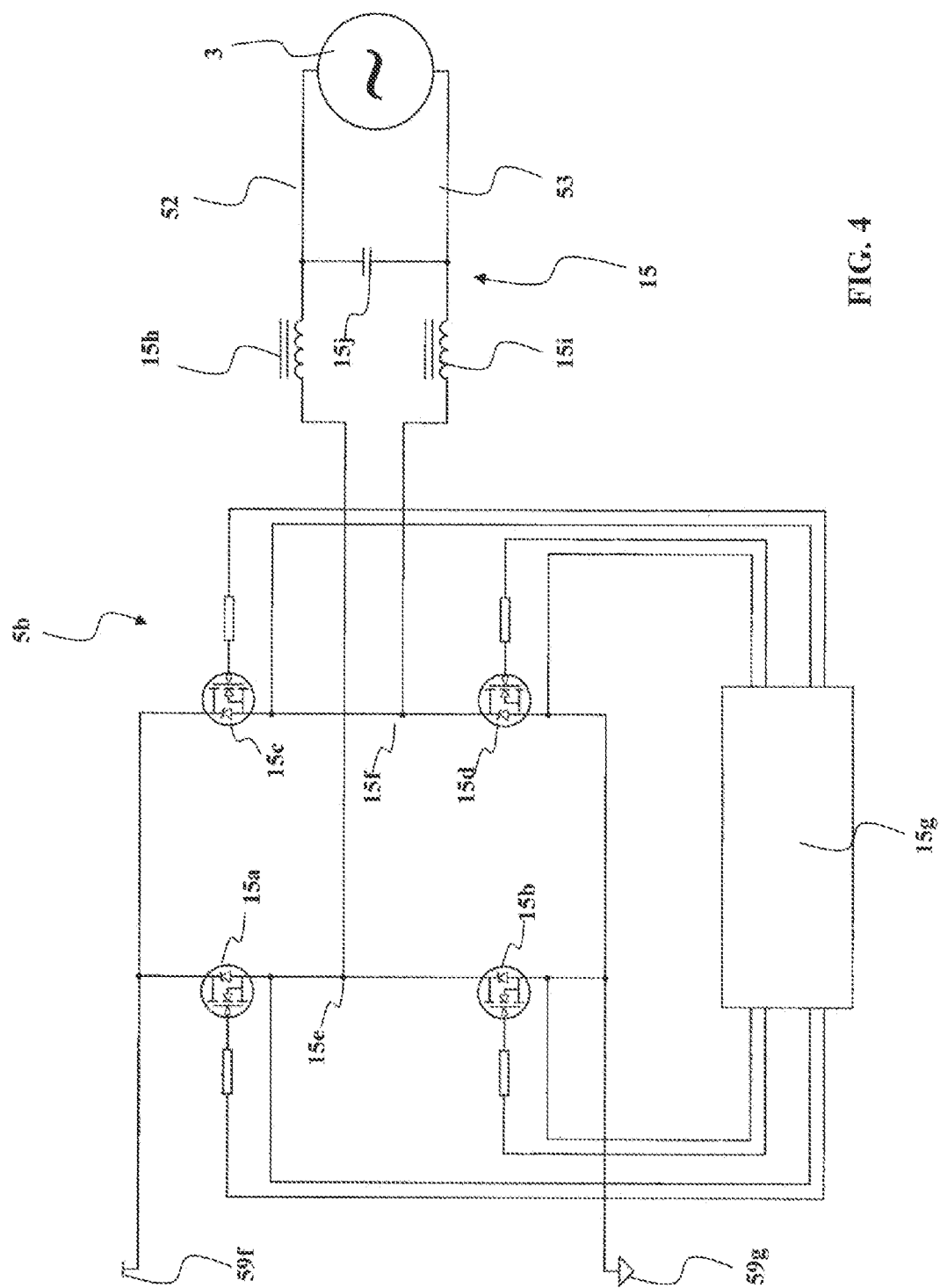
FIG. 4 is an electrical diagram of the second stage of the DC-AC converter according to one embodiment of the present invention.

Reference will now be made to FIGS. 3 and 4, which illustrate an embodiment of the present invention for the DC-AC converter 5 for powering the alternating current electric motor 3 from the direct voltage electrical energy delivered by the electrical energy accumulator element 2.

FIG. 3 illustrates the first stage 5a of the DC-AC converter 5, fulfilling the step-up DC-DC converter function, for converting the relatively low direct voltage of the electrical energy accumulator element 2 into a direct voltage with a sufficiently high value, at least equivalent to the peak voltage of the final alternating voltage wave contemplated for powering the alternating current electric motor 3.

In the illustrated embodiment, which can be selected for the sake of efficiency, the first stage 5a basically comprises an H-bridge of four electronic switches 52a, 52b, 52c and 52d, which each are advantageously of the MOSFET type (insulated gate field effect transistor). The electronic switches 52a and 52b are both connected in series between the input terminals 50 and 51, and their junction point 55a is connected to a first terminal of the primary of a step-up transformer 54. Similarly, the electronic switches 52c and 52d are both connected in series between the input terminals 50 and 51, and their junction point 55b is connected to the second terminal of the primary of the step-up transformer 54.

The gates of the electronic switches 52a, 52b, 52c and 52d receive, by means of shaping circuits 56 and 57, pulse control signals generated by a microcontroller 58 on its outputs 58a and 58b. The microcontroller 58 is programmed to successively control, via its output 58a, the conduction of the pair of electronic switches 52a and 52d, then, via its output 58b, the conduction of the pair of electronic switches 52b and 52c, producing a square wave power supply with a duty cycle of 1/1 on the primary of the transformer 54.

The secondary of the step-up transformer 54 is connected to the input of a rectifier element 59, which, in the illustrated embodiment, is a rectifier bridge made up of four diodes 59a, 59b, 59c and 59d, and which is associated with one or more filtering capacitors 59e in order to produce a rectified and filtered electric voltage on the output terminals 59f and 59g.

The step-up transformer 54 is a high-frequency transformer, advantageously of the planar type, capable of operating at high frequency, for example, at a frequency of approximately 50 kHz. This allows sufficient power transmission with a low volume and compact transformer. In such a planar transformer, the primary winding and the secondary winding each can be made up of a stack of flat elementary coils each comprising one or more layers of copper electrically isolated from each other, the ends of which are electrically connected to one another, while the magnetic circuit is made up of assembled ferrite cores. Examples of such planar transformers are described, for example, in documents EP 3300090 A1 or U.S. Pat. No. 7,663,460 B2. By way of an example, good results can be obtained by using a TP32D2402 referenced planar transformer produced and sold by the Chinese company Shaanxi Gold-Stone Electronics Co., LTD.

The electronic switches 52a, 52b, 52c and 52d operate at a relatively low voltage, with the peak voltage being equal to the direct voltage of the electrical energy accumulator element 2, i.e., approximately 24 V to 30 V. In order to produce the power required for powering the motor 3, the conveyed current must be fairly high, which requires the use of field effect transistors with very good on-state features. Moreover, these electronic switches must have a switching speed that is less than or equal to the natural descent of the current during switching, so as to avoid unnecessarily dissipating too much energy during switching.

Reference will now be made to FIG. 4, which illustrates the second stage 5b of the DC-AC converter 5. This second stage converts the direct output voltage of the first stage 5a into a sinusoidal alternating voltage capable of powering the electric motor 3. In the illustrated embodiment, this second stage 5b is in the form of an H-bridge made up of four electronic switches 15a, 15b, 15c and 15d, which each are advantageously of the MOSFET type (insulated gate field effect transistor). The electronic switches 15a and 15b are both connected in series between the input terminals 59f and 59g, and their junction point 15e is connected to a first output terminal 52 by means of a low-pass filter 15. Similarly, the electronic switches 15c and 15d are both connected in series between the input terminals 59f and 59g, and their junction point 15f is connected to the second output terminal 53 by means of the same low-pass filter 15.

Figure 5:
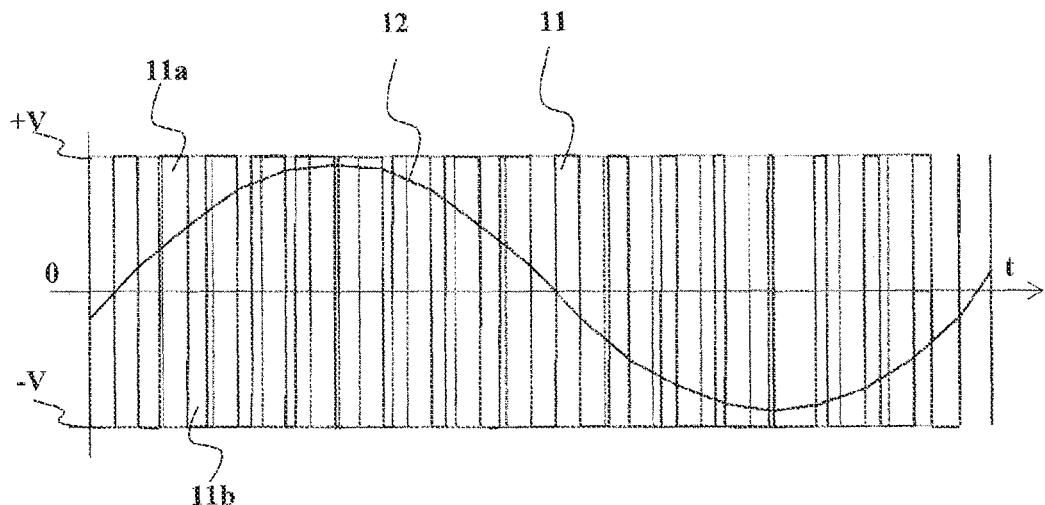
FIG. 5 is a time diagram illustrating the bipolar pulse width modulated waveform of the output electric voltage of the DC-AC converter powering the alternating current electric motor.

The gates of the electronic switches 15a, 15b, 15c and 15d receive pulse control signals generated by a microcontroller 15g on its respective outputs. The microcontroller 15g is programmed to successively control the conduction of the pair of electronic switches 15a and 15d in order to generate a positive pulse 11a as output, then the conduction of the pair of electronic switches 15b and 15c in order to generate a negative pulse 11b as output, and so on, with a bipolar pulse width modulation producing an output voltage 11 with variable duty cycle slots at the junction points 15e and 15f, as illustrated in FIG. 5.

The low pass filter 15 can comprise, for example, a first inductor 15h in series between the junction point 15e and the output terminal 52, a second inductor 15i in series between the junction point 15f and the output terminal 53, and a capacitor 15j between the output terminals 52 and 53. At the output of the filter 15, the voltage applied to the motor 3 is close to a sinusoid, as illustrated by the curve 12 in FIG. 5.

Figure 6:
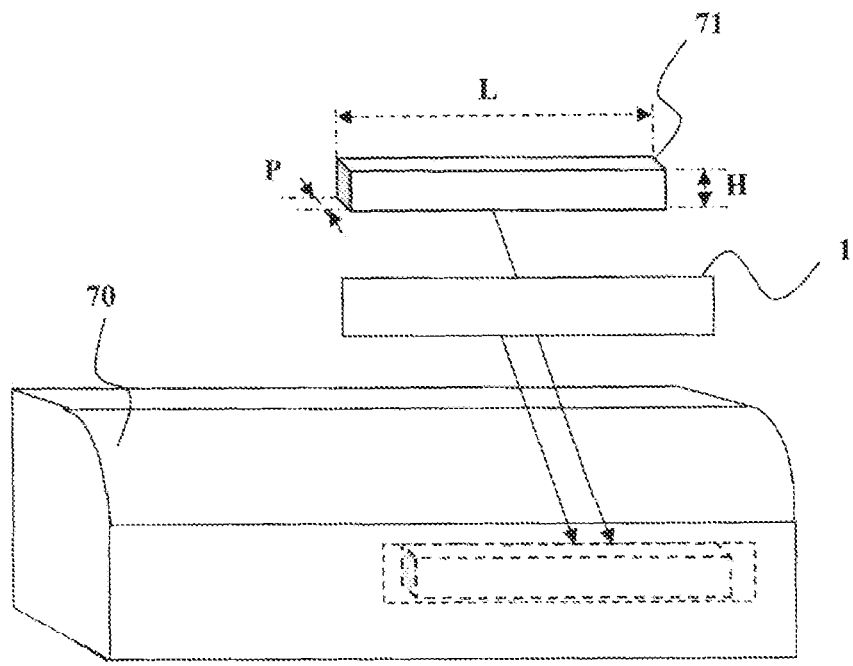
FIG. 6 illustrates the positioning, in a motor enclosure, of the solar electrical energy source and of all the electronic circuits according to the present invention for powering the motor for driving a shutter or closure component.

FIG. 6 illustrates a motor enclosure 70 for a shutter or closure component, the location of the solar electrical energy source 1 on the surface of the motor enclosure 70, and the location of the electronic assembly 71 made up of the electrical energy accumulator element and of the various electronic circuits described above, allowing the alternating current electric motor to be powered and controlled with a nominal voltage of 230 V for driving a shutter or closure component.

By virtue of the technological choices described above, the electronic assembly 71 is particularly compact, occupying a substantially parallelepiped volume with a length L that is less than or equal to 350 mm, a height H of approximately 70 mm, a depth P of approximately 20 mm.

This allows the electronic assembly 71 to be housed inside the motor enclosure 70, in a position adjacent to the solar electrical energy source 1, which is itself on the surface of the motor enclosure 70.

The present invention is not limited to the embodiments that have been explicitly described, but it includes the various alternative embodiments and generalizations contained within the scope of the following claims.

The invention claimed is:

1. A drive device for a closure or shutter component in a building, comprising:
   at least one motor mechanically coupled to the closure or shutter component;
   a direct current electrical energy accumulator element for delivering a direct electrical energy having a direct output voltage;
   a solar electrical energy source delivering a solar electrical energy having a direct solar voltage and a solar electric current;
   a DC-AC converter that converts said direct electrical energy into an alternating electrical energy having an alternating output voltage;
   wherein:
   the motor is a low-voltage alternating current electric motor having an effective electric voltage in a range between 50 to 1,000 V;
   said direct solar voltage is lower than the effective electric voltage of the electric motor;
   the electrical energy accumulator element has a nominal voltage lower than said effective electric voltage and greater than the direct solar voltage delivered by the solar electrical energy source;
   a DC-DC charger converts said solar electrical energy of the solar electrical energy source into a DC electrical energy having a DC voltage equal to a recharging electric voltage of the direct current electrical energy accumulator element;
   the DC-AC converter supplies said alternating current electric motor with said alternating output voltage.

2. The drive device as claimed in claim 1, wherein the effective electric voltage of the electric motor is approximately 230 V.

3. The drive device as claimed in claim 1, wherein the direct solar voltage of the solar electrical energy source is within a range of approximately 12 to 18 V.

4. The drive device as claimed in claim 1, wherein the nominal voltage of the electrical energy accumulator element is within a range of approximately 24 V to 30 V.

5. The drive device as claimed in claim 1, wherein the DC-DC charger is controlled by a control circuit regulating the direct solar voltage and the solar electric current drawn from the solar electrical energy source, so as to remain as close as possible to a maximum power point of the solar electrical energy source.

6. The drive device as claimed in claim 1, wherein the DC-AC converter is a converter with two successive stages, comprising a first stage in the form of a step-up DC-DC converter, which converts the direct output voltage of the electrical energy accumulator element into a direct step-up voltage at least equivalent to a peak voltage of said alternating output voltage contemplated for powering the electric motor, and comprising a second stage, which converts the direct step-up voltage of the first stage into said sinusoidal alternating output voltage capable of powering the electric motor.

7. The drive device as claimed in claim 6, wherein the step-up DC-DC converter comprises a first H-bridge of first electronic switches, said first H-bridge having first input points which are at terminals of the electrical energy accumulator element, and having first junction points which supply a primary of a step-up transformer, said transformer having a secondary which supplies a rectifier element providing said direct step-up voltage.

8. The drive device as claimed in claim 7, wherein the step-up transformer is a planar transformer capable of operating at high frequency.

9. The drive device as claimed in claim 8, wherein the first H-bridge of the step-up DC-DC converter operates at a frequency of approximately 50 KHz.

10. The drive device as claimed in claim 6, wherein the second stage comprises a second H-bridge of second electronic switches, said second H-bridge having second input points which are at terminals of the rectifier element, and having second junction points which supply the motor by means of a low-pass filter, the second electronic switches being controlled by a microcontroller programmed to carry out a bipolar pulse width modulation producing a second output voltage with variable duty cycle slots at the second junction points which, after filtration by the low-pass filter, powers the motor with said alternating output voltage which is substantially sinusoidal single-phase.

11. A closure or shutter component in a building, provided with a drive device as claimed in claim 1.

* * * * *